(12) United States Patent
Kodama et al.

(10) Patent No.: US 10,649,675 B2
(45) Date of Patent: May 12, 2020

(54) STORAGE CONTROLLER, STORAGE DEVICE, DATA PROCESSING METHOD, AND COMPUTER PROGRAM PRODUCT

(71) Applicant: TOSHIBA MEMORY CORPORATION, Minato-ku (JP)

(72) Inventors: Tomoya Kodama, Kawasaki (JP); Takayuki Itoh, Kawasaki (JP); Katsuyuki Nomura, Hino (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 158 days.

(21) Appl. No.: 15/259,657

(22) Filed: Sep. 8, 2016

(65) Prior Publication Data

US 2017/0228177 A1    Aug. 10, 2017

(30) Foreign Application Priority Data

Feb. 10, 2016    (JP) .................. 2016-024057

(51) Int. Cl.
*G06F 3/06* (2006.01)

(52) U.S. Cl.
CPC .............. *G06F 3/0641* (2013.01); *G06F 3/06* (2013.01); *G06F 3/0613* (2013.01); *G06F 3/0679* (2013.01); *G06F 3/0688* (2013.01)

(58) Field of Classification Search
CPC .. G06F 3/0641; G06F 3/0679; G06F 12/1018; G06F 12/0646; G06F 11/1453; G06F 17/3033; G06F 17/30371; G06F 17/30097; G06F 17/30156
See application file for complete search history.

(56) References Cited

U.S. PATENT DOCUMENTS

| | | | |
|---|---|---|---|
| 2009/0254507 A1* | 10/2009 | Hosoya | G06F 3/0608 706/48 |
| 2009/0327581 A1 | 12/2009 | Coulson | |
| 2014/0229790 A1* | 8/2014 | Goss | G06F 11/1048 714/755 |
| 2014/0304464 A1 | 10/2014 | Bert | |
| 2016/0055200 A1* | 2/2016 | McCreight | G06F 17/30097 707/692 |

(Continued)

FOREIGN PATENT DOCUMENTS

| | | |
|---|---|---|
| JP | 2009-87021 A | 4/2009 |
| JP | WO 2015/008375 A1 | 1/2015 |

(Continued)

*Primary Examiner* — Masud K Khan
(74) *Attorney, Agent, or Firm* — Oblon, McClelland, Maier & Neustadt, L.L.P.

(57) ABSTRACT

According to an embodiment, a storage controller comprises a circuitry configured to implement an address generator, a reader, and a duplication detector. The address generator is configured to generate a scan address indicating each storage area of a storage that stores therein externally written data, according to a particular scan pattern for defining an order of an address of data to be read. The reader is configured to read data from the storage area of the storage indicated by the scan address. The duplication detector is configured to detect whether the data read by the reader is a duplicate of any one of a past predetermined number of pieces of data.

13 Claims, 7 Drawing Sheets

(56) References Cited

U.S. PATENT DOCUMENTS

| | | | |
|---|---|---|---|
| 2016/0110249 A1* | 4/2016 | Orme | G06F 3/0619 |
| | | | 714/6.24 |
| 2016/0283395 A1* | 9/2016 | Jung | G06F 3/0613 |
| 2016/0313932 A1 | 10/2016 | Kodama et al. | |
| 2017/0017571 A1* | 1/2017 | Choi | G06F 12/0246 |
| 2017/0102896 A1* | 4/2017 | D'Abreu | G06F 3/0638 |

FOREIGN PATENT DOCUMENTS

| | | |
|---|---|---|
| JP | 2016-207033 A | 12/2016 |
| WO | WO 2015/125271 A1 | 8/2015 |
| WO | WO 2016/006050 A1 | 1/2016 |

* cited by examiner

| LOGIC ADDRESS | NAND ADDRESS |
|---|---|
| 0000 0000 | 0000 0000 0000 |
| 0000 0001 | 01c0 26a0 ccb0 |
| 0000 0002 | 7f00 ac67 d973 |
| ... | ... |
| x | 8000 0000 0000 |
| ... | ... |
| y | 8000 0000 0100 |
| ... | ... |

| NAND ADDRESS | VALID FLAG |
|---|---|
| 0000 0000 0000 | 0 |
| 0000 0000 0001 | 1 |
| 0000 0000 0002 | 0 |
| ... | ... |
| ffff ffff fffe | 1 |
| ffff ffff ffff | 1 |

STORAGE CONTROLLER, STORAGE DEVICE, DATA PROCESSING METHOD, AND COMPUTER PROGRAM PRODUCT

CROSS-REFERENCE TO RELATED APPLICATION

This application is based upon and claims the benefit of priority from Japanese Patent Application No. 2016-024057, filed on Feb. 10, 2016; the entire contents which are incorporated herein by reference.

FIELD

Embodiments described herein relate generally to storage controller, a storage device, a data processing method, and a computer program product.

BACKGROUND

In recent years, there has been proposed a technique that reduces the amount of stored data and reduces the number of writing times to a NAND (Not AND)-type flash memory incorporated in a storage device, such as a solid state drive (SSD), with de-duplication or compression techniques, to prolong the lifetime of such a storage device. In writing data into a NAND-type flash memory, such a de-duplication technique determines, for each data unit referred to as a chunk obtained by dividing data to be written into a predetermined size, a duplicate candidate between chunks with the use of a hash value calculated with a particular algorithm using, for example, a hash function. Also, there has been proposed a duplication removing method that actually checks whether there is a duplicate of the duplicate candidate in a back-end process, and removes one when such a duplicate is found. Algorithms that determine a hash value from one-chunk data includes various algorithms, such as Message Digest 5 (MD5), Secure Hash Algorithm 1 (SHA-1), or SHA-2, for example.

However, such a duplication search between chunks using a hash value usually uses a hash list that stores past hash values having limited sizes, but there is a problem in that, when the size of the hash list is insufficient, such a search is not carried out in a wide range and duplicate data cannot be effectively detected. For example, it is assumed that the data length of a chunk is 4 [KB (kilo bytes)] and a hash list stores a hash value of 20 [B] and an address of 8 [B] indicating a storage destination to a HAND-type flash memory. Assuming that the number of hash-value entries into the hash list is 2M-entry, the size of the hash list is 28[B]×2M=56 [MB]. However, the search range of a NAND-type flash memory that this hash list can cover is only 2M×4 [KB]=8 [GB] in principle. Thus, in this hash list, the duplication detection of data written in the past back to 8 [GB] or more is basically very difficult.

Such a hash list is frequently accessed and thus it is impractical to be stored in a NAND-type flash memory. Although an SSD often includes a dynamic random access memory (DRAM) as well as a NAND-type flash memory, such a DRAM is utilized as a work memory used for control between a host and the NAND-type flash memory that the SSD should essentially perform. Thus, it is difficult to allocate a hash list having a large capacity thereto for the duplication detection.

DETAILED DESCRIPTION

According to an embodiment, a storage controller comprises a circuitry configured to implement an address generator, a reader, and a duplication detector. The address generator is configured to generate a scan address indicating storage area of a storage that stores therein externally written data, according to a particular scan pattern for defining an order of an address of data to be read. The reader is configured to read data from the storage area of the storage indicated by the scan address. The duplication detector is configured to detect whether the data read by the reader is a duplicate of any one of a past predetermined number of pieces of data.

With reference to the drawings, a storage controller, a storage device, a method of processing data, and a computer program product according to an embodiment of the invention will now be described in detail. In the drawings, the same parts have the same reference number.

Figure 1:
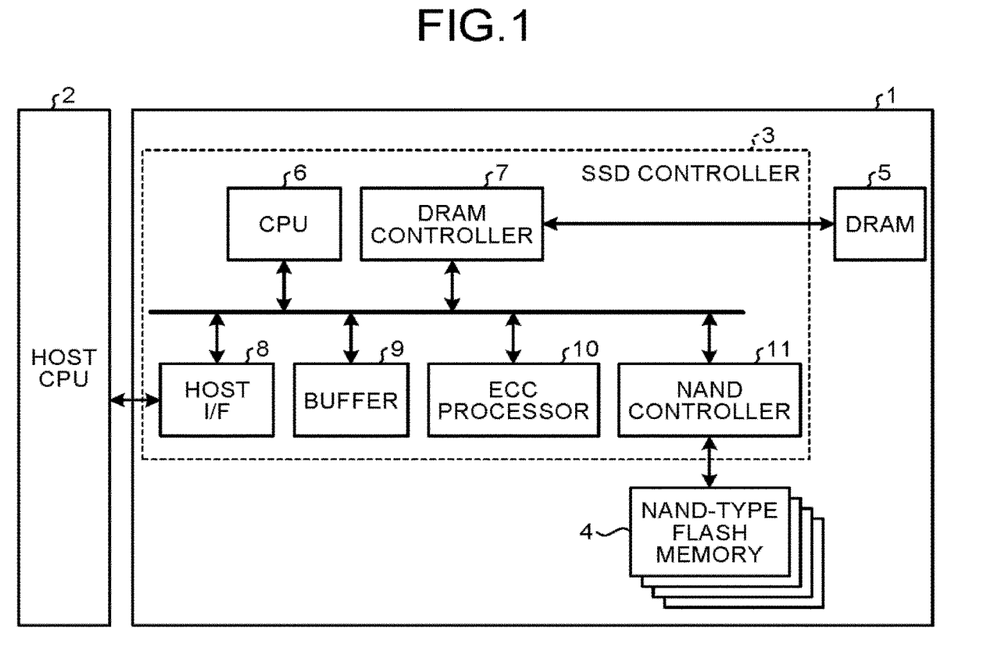
FIG. 1 is a diagram illustrating a hard configuration of a storage device according to an embodiment.

FIG. 1 is a diagram illustrating a hardware configuration of a storage device according to the embodiment. With reference to FIG. 1, the hardware configuration of a storage device 1 according to the embodiment will be described.

The storage device 1 is an SSD that a host CPU 2 (a controller) accesses to read and write data. The host CPU 2 is a central processing unit (CPU) incorporated into an information processing apparatus, such as a personal computer (PC), a work station, or a server apparatus. The storage device 1 may be a block storage that is coupled to the host CPU2 via an interfacing standard, such as Serial AT Attachment (BATA), Serial Attached SCSI (SAS), or Peripheral Component Interconnect Express (PCIe), and accesses data using a logical address (logical block address (LBA)), or may be a key-value drive that is coupled via Ethernet and accesses variable-length data associated with optional length data referred to as a key. The storage device 1 determines the storage area of a NAND-type flash memory 4 indicated by the physical address corresponding to a logical address or a key indicated by the host CPU 2, writes data given by the host CPU 2, and outputs read data to the host CPU 2. The storage device 1 is used as an SSD coupled to a host, such as a server apparatus, in a data center, a cloud system, or a backbone system, for example. The storage device 1 may be an SSD that is contained in the information processing apparatus and stores therein data including an operating system (OS), and may be an external SSD externally coupled to the information processing apparatus.

As illustrated in FIG. 1, the storage device 1 includes an SSD controller 3 (a storage controller), the NAND-type flash memory 4, and a DRAM 5.

The SSD controller 3 is a controller that controls reading and writing of data from and to the NAND-type flash memory 4 and the DRAM 5. The SSD controller 3 includes a CPU 6, a DRAM controller 7, a host I/F 8, a buffer 9, and an ECC processor 10, and a NAND controller 11, as illustrated in FIG. 1. As illustrated in FIG. 1, the CPU 6, the DRAM controller 7, the host I/F 8, the buffer 9, the FCC processor 10, and the NAND controller 11 described above are communicatively coupled to each other via a bus, such as an address bus and a data bus. In general, The SSD controller 3 includes one or more large scale Integrated circuits LSIs).

The NAND-type flash memory 4 is a type of a flash memory including non-volatile storage elements. The NAND-type flash memory 4 includes a plurality of NAND memory chips. The NAND-type flash memory 4 stores therein, for example, a computer program that the host CPU 2 executes and data, as well as a computer program that the CPU 6 executes.

The DRAM 5 is a volatile storage device including semiconductor storage cells. The DRAM 5, which is volatile, has a property of losing stored data upon shutoff of the supplied power.

The CPU 6 is an integrated circuit that controls the operation of the whole SSD controller 3. The DRAM controller 7 is a device that controls an access, such as reading and writing of data from and to the DRAM 5. The host I/F 8 is an interface via which the storage device 1 performs data communication with the host CPU 2.

The buffer 9 is a storage circuit that temporarily stores therein data received from the host CPU 2 and data read from the NAND-type flash memory 4 via the NAND controller 11.

The ECC processor 10 is an integrated circuit that imparts an error correcting code (ECC) to data received from the host CPU 2 via the host I/F 8 and temporarily stored in the buffer 9. Data with an error correcting code imparted by the ECC processor 10 is written into the NAND-type flash memory 4 by the NAND controller 11.

Figure 3:
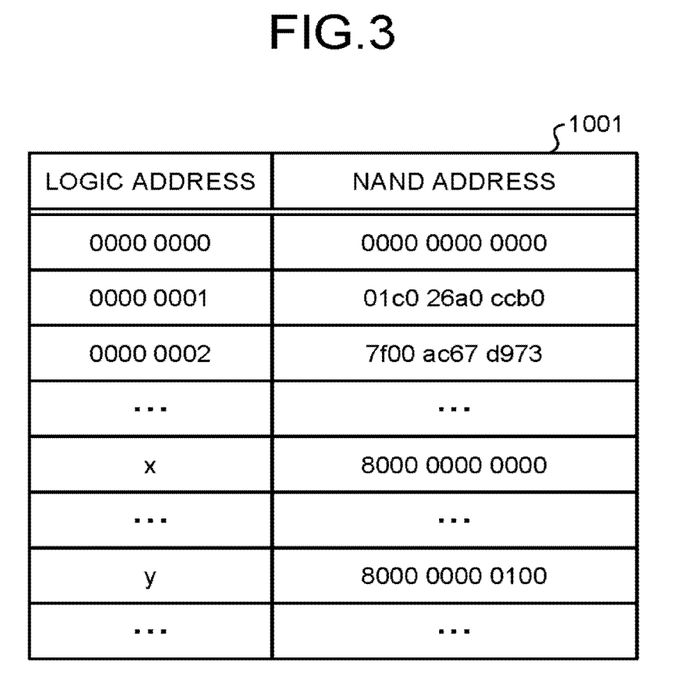
FIG. 3 is a diagram illustrating an example of a configuration of an address conversion table.

An outline of an operation in which the storage device 1 writes data received from the host CPU 2 into the NAND-type flash memory 4 will now be described. First, the SSD controller 3 of the storage device 1 receives a logical address and data to be written from the host CPU 2 via the host I/F 8, and temporarily stores them in the buffer 9. Next, the ECC processor 10 imparts an error correcting code determined based on data stored in the buffer 9 to the data, and the NAND controller 11 writes the data into the storage area of the NAND-type flash memory 4 indicated by the physical address corresponding to the logical address. In this case, the conversion from the logical address to the physical address is performed with reference to an address conversion table 1001, which is stored in the DRAM 5 and is illustrated in FIG. 3 described below.

An outline of an operation in which the host CPU 2 reads data from the NAND-type flash memory 4 of the storage device 1 will be described. First, the host CPU 2 indicates the logical address corresponding to data to be read to the SSD controller 3 of the storage device 1 via the host I/F 8. Next, the NAND controller 11 specifies the physical address corresponding to the indicated logical address with the above-described address conversion table 1001, and reads data with an error correcting code being imparted from the memory area of the NAND-type flash memory 4 indicated by the physical address. Then, the ECC processor 10 detects whether there is any error in the read data, with the error correcting code imparted to the data read by the NAND controller 11. If there is an error, the ECC processor 10 corrects the error with the error correcting code and stores the data body with the error correcting code being deleted in the buffer 9. Alternatively, if there is no error in the read data, the ECC processor 10 only deletes the error correcting code to store the data body in the buffer 9. The data stored in the buffer 9 is then output to the host CPU 2 via the host I/F 8.

The ECC processor 10 is implemented as an integrated circuit (hardware circuit) coupled to the bus, as illustrated in FIG. 1, but is not limited to this and may be implemented by the CPU 6 executing a computer program.

Figure 2:
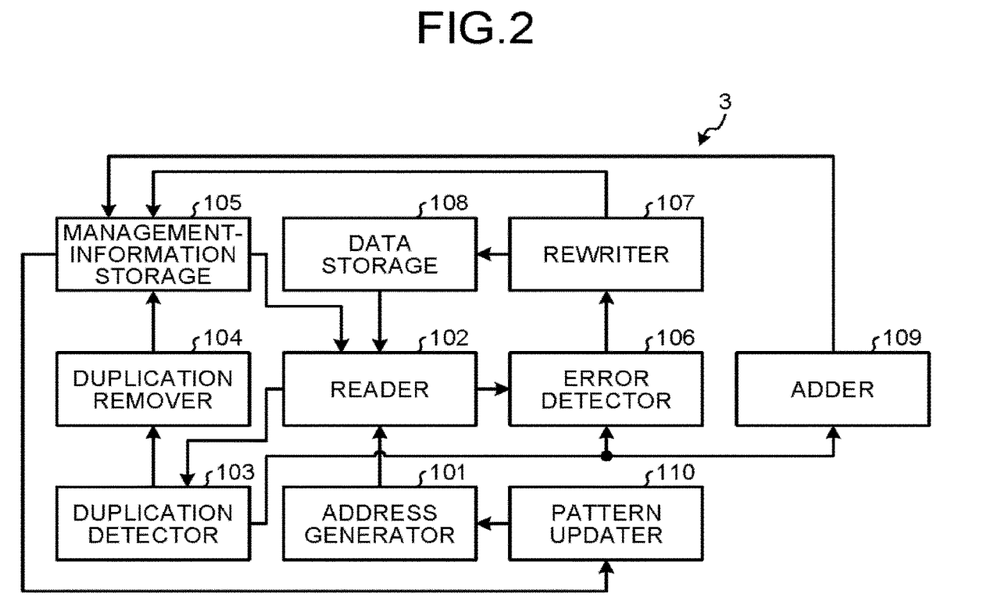
FIG. 2 is a diagram illustrating a function-block configuration of an SSD controller according to the embodiment.
Figure 4:
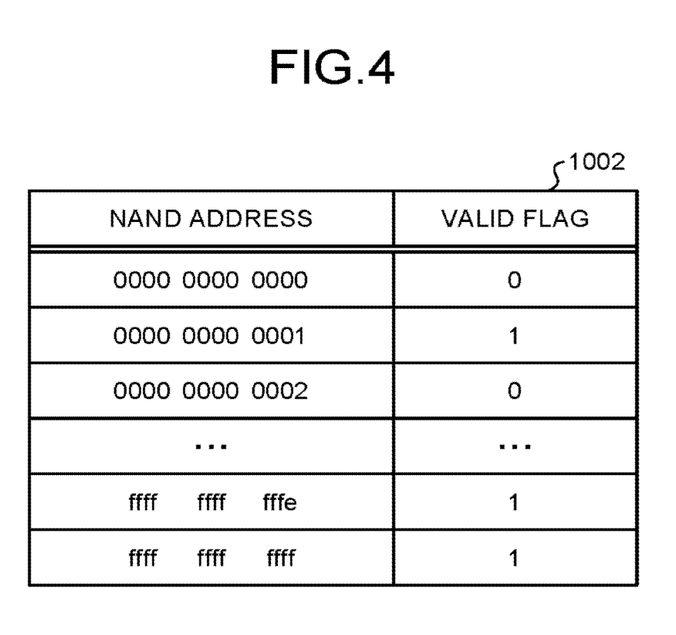
FIG. 4 is a diagram illustrating an example of a configuration of a validity management table.

FIG. 2 is a diagram illustrating an example of a function-block configuration of the SSD controller according to the embodiment. FIG. 3 is a diagram illustrating an example of a configuration of the address conversion table. FIG. 4 is a diagram illustrating an example of a configuration of the validity management table. With reference to FIGS. 2 to 4, the function-block configuration and the operation of the SSD controller 3 according to the embodiment will be described.

As illustrated in FIG. 2, the SSD controller 3 includes an address generator 101 (address generating means), a reader 102 (reading means), a duplication detector 103 (a duplication detecting means), a duplication remover 104, a management-information storage 105, an error detector 106, a rewriter 107, a data storage 108 (storage), an adder 109, and a pattern updater 110.

The address generator 101 is a functional unit that generates, based on a scanning pattern, a physical address (which may be referred to as "a NAND address", hereinafter) within the NAND-type flash memory 4 at which data to be scanned in the NAND-type flash memory 4, that is, data targeted for a duplication detecting process is stored. The duplication detecting process is performed for each data unit referred to as a chunk obtained by dividing data stored in the NAND-type flash memory 4 into a predetermined size. That is, the NAND address generated by the address generator 101 indicates the address of the storage area in which one-chunk data that is a data unit of a predetermined size is stored in the NAND-type flash memory 4. The length of one-chunk data may be any of a variable length or a fixed length, but will be described herein as a fixed length for a simple description. Hereinafter, the NAND address generated by the address generator 101 may be referred to as "a scan address". The address generator 101 is implemented by the CPU 6 illustrated in FIG. 1 executing a computer program. Details of the configuration and the operation of the address generator 101 will be described below with reference to FIGS. 5 and 6.

The reader 102 is a functional unit that reads one-chunk data stored in the storage area of the NAND-type flash memory 4 indicated by the scan address generated by the address generator 101 (which may be merely referred to as "a storage area", hereinafter). The reader 102 is implemented by the CPU 6 illustrated in FIG. 1 executing a computer program.

The duplication detector 103 is a functional unit that performs the duplication detecting process. This process detects whether one-chunk data that is a duplicate of the one-chunk data read by the reader 102 is stored in a different storage area, in the NAND-type flash memory 4. The duplication detector 103 is implemented by the CPU 6 illustrated in FIG. 1 executing a computer program. Details of the configuration and the operation (duplication detecting process) of the duplication detector 103 will be described below with reference to FIGS. 7 and 8.

The management-information storage 105 is a functional unit that stores management information used in a duplication removing process illustrated in FIG. 9 described below. Specifically, as management information, the management-information storage 105 stores therein the address conversion table 1001 illustrated in FIG. 3 and a validity-management table 1002 illustrated in FIG. 4. The address conversion table 1001 is a table that associates a logical address indicated by the host CPU 2 with a NAND address that is a physical address indicating a storage area in which data is actually stored. The validity-management table 1002 is a table that associates a NAND address with a valid flag that indicates whether data stored in the storage area indicated by the NAND address is valid. For example, as illustrated in FIG. 4, data stored in the storage area indicated by a NAND address "0000 0000 0001" (hexadecimal notation, the same hereinafter) has its valid flag of "1", and thus it is indicated that the data is valid. Such valid data means data that has been written by the host CPU 2 into the NAND-type flash memory 4 in the past and the erasing or moving (substantially overwriting) thereof is not carried out after that.

As the management information, the management-information storage 105 further stores therein a hash table 1003 (an example of second information) and a hash list 1004 (an example of first information) illustrated in FIG. 8 described below. The hash table 1003 and the hash list 1004 will be described below. The management-information storage 105 is implemented by the DRAM 5 illustrated in FIG. 1. At least one piece of the management information stored in the management-information storage 105 may be stored in the NAND-type flash memory 4 instead of the DRAM 5. In this case, the management-information storage 105 will be implemented by at least one of the NAND-type flash memory 4 or the DRAM 5 illustrated in FIG. 1.

The address conversion table 1001 illustrated in FIG. 3 is not limited to table format information, and may be any format information capable of associating a legs logical address with a NAND address. The validity-management table 1002 illustrated in FIG. 4 is not also limited to table format information, and may be any format information capable of determining whether data written in the storage area indicated by a NAND address is valid.

The duplication remover 104 is a functional unit that, when the duplication detector 103 detects one-chunk data that is a duplicate of one-chunk data read by the reader 102, removes the duplicate data. Specifically, for example, in FIG. 3, the duplication detector 103 detects that one-chunk data of a scan address of "8000 0000 0100" is a duplicate of one-chunk data of a NAND address "8000 0000 0000" in the storage area. As illustrated in FIG. 3, assuming that the logical address corresponding to the NAND address "8000 0000 0100" is "y" and the logical address corresponding to the NAND address "8000 0000 0000" is "x", the line of logical address "x" in the address conversion table 1001 stores the NAND address "8000 0000 0000" and the line of the logical address "y" stores the NAND address "8000 0000 0100". The duplication detector 103 detects that the data in the storage area indicated by the NAND address "8000 0000 0100" and the data in the storage area indicated by the NAND address "8000 0000 0000" are duplicates. As a result, although the NAND address "8000 0000 0100" corresponding to the lade logical address "y" is overwritten with "8000 0000 0000", no inconsistency occurs as data read based on the logical address "x" or "y". In this case, the duplication remover 104 thus overwrites the NAND address "8000 0000 0100" corresponding to the logical address "y" with the NAND address "8000 0000 0000" corresponding to the logical address "x". That is, the NAND address corresponding to both the logical addresses "x" and "y" is "8000 0000 0000", and the data in the storage area indicated by the NAND address "8000 0000 0100" will be unnecessary in future. Thus, the duplication remover 104 refers to the validity management table 1002, which is stored in the management-information storage 105, and overwrites the valid flag corresponding to the NAND address "8000 0000 0100" with "0" to invalidate it. The duplication remover 104 is implemented by the CPU 6 illustrated in FIG. 1 executing a computer program.

In the above description, the duplication remover 104 overwrites the NAND address "8000 0000 0100" (scan address) corresponding to the logical address with the NAND address "8000 0000 0000" corresponding to the logical address "x", but is not limited to this. That is, the duplication remover 104 may overwrite the NAND address "8000 0000 0000" corresponding to the logical address "x" with the NAND address "8000 0000 0100" corresponding to the logical address "y". However, in this case, the data in the storage area indicated by the NAND address "8000 0000 0000" corresponding to the duplicate logical address "x" is stored as past data (a hash value) in the hash list 1004, as described below. Thus, the duplication remover 104 needs to overwrite the NAND address "8000 0000 0000" with "8000 0000 0100" in the hash list 1004 as well.

The error detector 106 is a functional unit that calculates an error rate r of one-chunk data read from the storage area indicated by a scan address with Equation (1) below and performs a threshold determination of the calculated error rate r to detect an error.

$$r = n_e / N \quad (1)$$

In Equation (1), $n_e$ indicates the number of error bits in one chunk and N indicates the number of bits constituting one chunk. The error detector 106 determines the correctable number of error bits $n_e$ based on an error correcting code imparted to the read one-chunk data, and calculates an error rate r with Equation (1). Generally, data written into the NAND-type flash memory 4 gradually deteriorates with a lapse of time and a read operation of another adjacent data. It can be determined that the error rate r having a large value is attributed to advanced deterioration. Thus, the error detector 106 determines whether the error rate r is equal to or greater than a predetermined threshold. When the error rate r is equal to or greater than such a threshold, the error detecting element 106 determines that data deterioration advances. The error detector 106 is implemented by the ECC processor 10 illustrated in FIG. 1.

The rewriter 107 is a functional unit that rewrites data on which it is determined by the error detector 106 that its deterioration advances (data on which it is determined that the error rate r is equal to or greater than a threshold) into a different storage area of the data storage 108. In this case, for data with a detected error, the rewriter 107 corrects the error based on the imparted error correcting code and adds a new error correcting code to the corrected data, to rewrite it into a different storage area of the data storage 108. Such rewriting causes the written data to be refreshed, and thus allows the occurrence of a bit error to be inhibited. As error-correcting algorithms, various algorithms using Reed-Solomon (RS) code, BCH code, and Low Density Parity Check (LDPC) code and other codes are known. When BCH code is employed as an error-correcting algorithm, an example that can correct a bit error up to 16 bits by adding an error correcting code of 256 bits to data of 4,096 bytes is shown, for example, in the well-known publication, H. Choi, W. Liu. et al., "VLSI implementation of BCH Error Correction for Multilevel Cell NAND Flash Memory", IEEE Transactions on Very Large Scale Integration (VLSI) Systems, Vol. 18, No. 5, May 2010.

With the rewriting of data, the rewriter 107 updates the contents of the address conversion table 1001, the validity-management table 1002, and the hash list 1004, which are stored in the management-information storage 105. The contents of such an updating will be described below with reference to FIG. 9. The rewriter 107 is implemented by the NAND controller 11 illustrated in FIG. 1.

The data storage 108 is a functional unit that stores therein, for example, a computer program that the host CPU 2 executes, and data, as well as a computer program that the CPU 6 executes. The data storage 108 is implemented by the NAND-type flash memory 4 illustrated in FIG. 1.

The adder 109 is a functional unit that, when the duplication detector 103 fails to detect one-chunk data that is a duplicate of one-chunk data read by the reader 102, updates the contents of the hash table 1003 and adds information to the hash list 1004, assuming that the read data is new data. Details about the updating of the contents of the hash table 1003 and the addition of information to the hash list 1004 will be described below with reference to FIG. 9. The adder 109 is implemented by the CPU 6 illustrated in FIG. 1 executing a computer program.

The pattern updater 110 is a functional unit that updates a scan pattern for generating a NAND address scan address) of a storage area in which data that the address generator 101 targets for the duplication detecting process is stored. The pattern updater 110 is implemented by the CPU 6 illustrated in FIG. 1 executing a computer program.

The address generator 101, the reader 102, the duplication detector 103, the duplication remover 104, the management-information storage 105, the error detector 106, the rewriter 107, the data storage 108, the adder 109, and the pattern updater 110 of the SSD controller 3 illustrated in FIG. 2 are a conceptual presentation of their functions, and are not limited to such a configuration. For example, a plurality of functional units represented as separate functional units in the SSD controller 3 illustrated in FIG. 2 may be configured as a functional unit. In contrast, the function of a functional unit in the SSD controller illustrated in FIG. 2 may be divided into a plurality of functions to be configured as a plurality of functional units.

Some or all of the address generator 101, the reader 102, the duplication detector 103, the duplication remover 104, the adder 109, and the pattern updater 110 of the SSD controller 3 may be implemented by hardware circuits, such as a field-programmable gate array (FPGA) or an application specific integrated circuit (ASIC), instead of a computer program as software. The error detector 106 of the SSD controller 3 may be implemented by the CPU 6 executing a computer program, instead of such a hardware circuit (the ECC processor 10).

Figure 5:
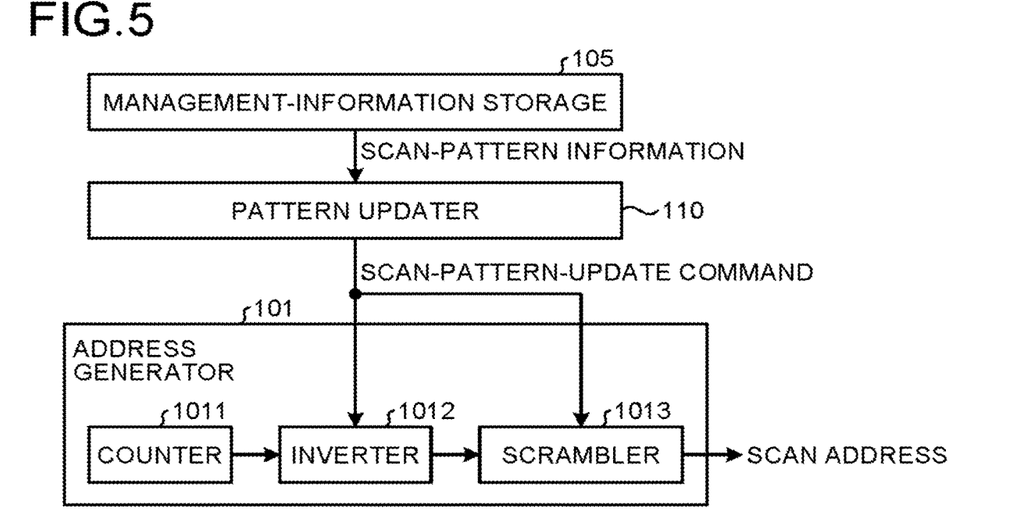
FIG. 5 is a diagram illustrating a function-block configuration of an address generator of the embodiment.
Figure 6:
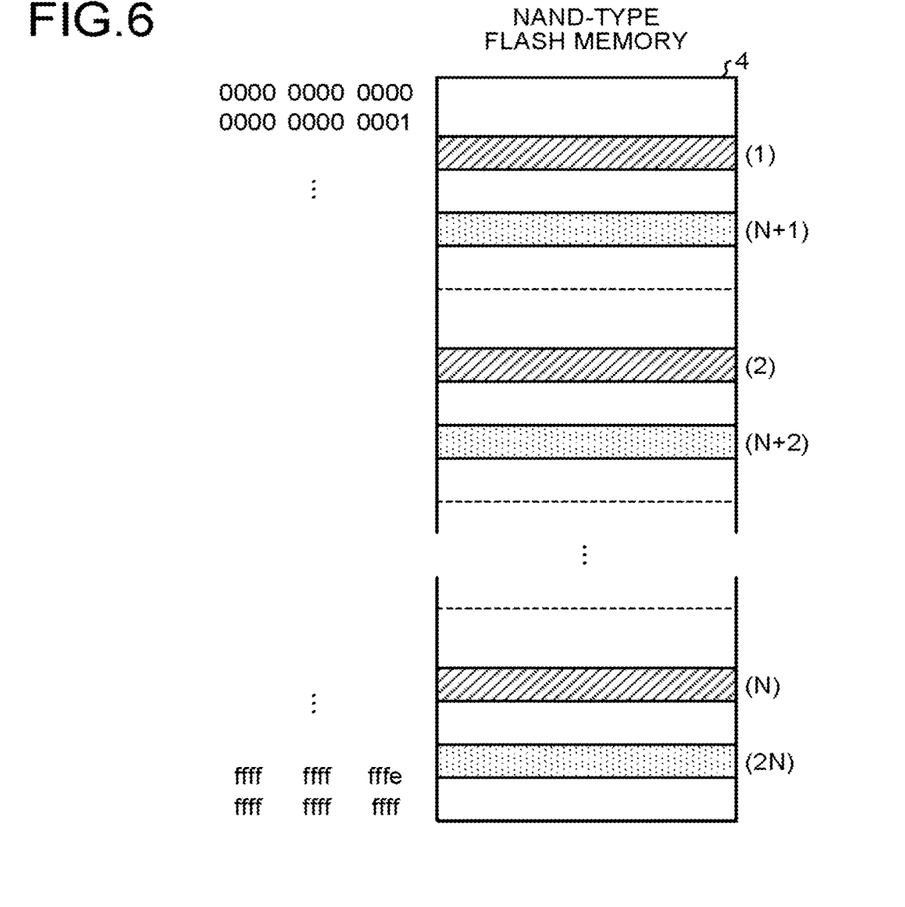
FIG. 6 is a diagram illustrating of a processing sequence of duplication detection of data according to a scan pattern.

FIG. 5 is a diagram illustrating an example of a function-block configuration of the address generator of the SSD controller according to the embodiment. FIG. 6 is a diagram illustrating of a processing sequence of duplication detection of data according to a scan pattern. With reference to FIGS. 5 and 6, the function-block configuration and the operation of the address generator 101 of the SSD controller 3 will be described.

As illustrated in FIG. 5, the address generator 101 includes a counter 1011, an inverter 1012, and a scrambler 1013.

The counter 1011 is a functional unit that determines a counter value for generating a scan address. The bit width w of a counter value is determined in Equation (2) below.

$$w=\mathrm{ceil}\{\log_2(B/N)\} \quad (2)$$

In Equation (2), B shall indicate the storage capacity of the data storage 108; N shall indicate the number of bits constituting one chunk, that is, the size of one chunk; and the Cecil (x) shall be a function that returns the nearest integer equal to or greater than x. That is, the maximum value of counter values determined from a bit width w determined in Equation (2) corresponds to the number of NAND addresses that indicate all the chunks in the data storage 108. After a scan address being determined from a particular counter value, the counter 1011 increments the counter value when generating the next scan address.

The inverter 1012 is a functional unit that reverses each bit of a counter value output from the counter 1011 or outputs it as is without its inversion, based on a particular scan pattern. Specifically, when an inversion mode indicated by the particular scan pattern is "ON", the inverter 1012 reverses each bit of the counter value to output it. For example, for a counter value of 8 bits, when the counter 1011 outputs counter values of "00", "01", and "02" (hexadecimal notation), respective data after the bit inversion caused by the inverter 1012 are "off", "Fe", and "FD" (hexadecimal notation) and these pieces of data are output in descending order. In contrast, when the inversion Mode indicated by the particular scan pattern is "OFF", the inverter 1012 outputs each bit of the counter value as is without its inversion. The inverter 1012 may reverse only some bits of the counter value based on the particular scan pattern, instead of reversing each bit of the counter value as described above.

The scrambler 1013 is a functional unit that replaces each bit of data output from the inverter 1012 according to a scramble pattern indicated by a particular scan pattern to output a scan address. For example, for data of "00", "01", "02", and "03" (hexadecimal notation), when the first bit (bit 0) is replaced with the fourth bit (bit 3), respective data output from the scrambler 1013 are "00", "08", "02", and "0a" (hexadecimal notation).

As above, according to the counter value output from the counter 1011, the inversion mode of the inverter 1012, and the scramble pattern of the scrambler 1013, the address generator 101 can generate scan addresses in various orders. As illustrated in FIG. 5, the management-information storage 105 stores therein scan-pattern information including the inversion mode and the scramble pattern, and the pattern updater 110 reads particular scan-pattern information from the management-information storage 105 according to a predetermined manner or randomly from the management-information storage 105. The pattern updater 110 then outputs a scan-pattern-update command to update the inversion mode of the inverter 1012 and the scramble pattern of the scrambler 1013 based on the read scan-pattern information.

With reference to FIG. 6, an example of the order of scan addresses that the address generator 101 generates based on a particular scan pattern will now be described. In the example of FIG. 6, NAND addresses from "0000 0000 0000" to "ffff ffff ffff" shall be allocated to the storage area of the NAND-type flash memory 4. Assuming that the storage area of the NAND-type flash memory 4 is divided into N blocks, the address generator 101 generates a scan address indicating a predetermined location from the top of each block, with a particular scan pattern. That is, as illustrated in FIG. 6, the address generator 101 first generates a scan address indicating a predetermined location (1) from the top of the top block. Next, the address generator 101 generates a scan address indicating a predetermined location (2) from the top of the block following the top one. Similarly, the address generator 101 generates scan addresses. After generating a scan address indicating a predetermined location (N) at the Nth block, when generating the next scan address, the address generator 101 generates a scan address indicating a predetermined location (N+1) different from the location (1) in the top block and then generates a scan address indicating a predetermined location (N+2) different from the location (2) in the block following the top one. The above order of scan addresses that the address generator 101 generates is an example, but applying a scan pattern in this way enables discontinuous scan addresses to be generated.

In FIG. 6, for example, the duplication detecting process is performed on data at the predetermined location (N) in the last block (the Nth block), and the duplication detecting process is then performed on data at the predetermined location (N+1) in the first block. Thus, the duplication detecting process determines whether the data at the location (N) and the data at the location (N+1) are duplicates. For example, assuming that the number of entries of the hash list that the management-information storage 105 stores therein is N and N is enough smaller than the number of addresses of the address space ("0000 0000 0000" to "ffff ffff ffff") of the NAND-type flash memory 4 illustrated in FIG. 6, when performing the duplication detecting process on the NAND-type flash memory 4 by linear search from the top address, the duplication determination between the location (N) and the location (N+1) fails. However, applying a scan pattern and generating discontinuous scan addresses enables the duplication detection for respective data at separate NAND addresses, and enables the duplication detection for the whole NAND-type flash memory 4 with a hash list that stores some past hash values (as described above, N, for example) without an enormous hash list having hash values of all the data in the NAND-type flash memory 4.

The counter 1011, the inverter 1012, and the scrambler 1013 of the address generator 101 illustrated in FIG. 5 are a conceptual presentation of their functions, and are not limited to such a configuration. For example, a plurality of functional units represented as separate functional units in the address generator 101 illustrated in FIG. 5 may be configured as a functional unit. In contrast, the function of a functional unit in the address generator 101 illustrated in FIG. 5 may be divided into a plurality of functions to be configured as a plurality of functional units.

Figure 7:
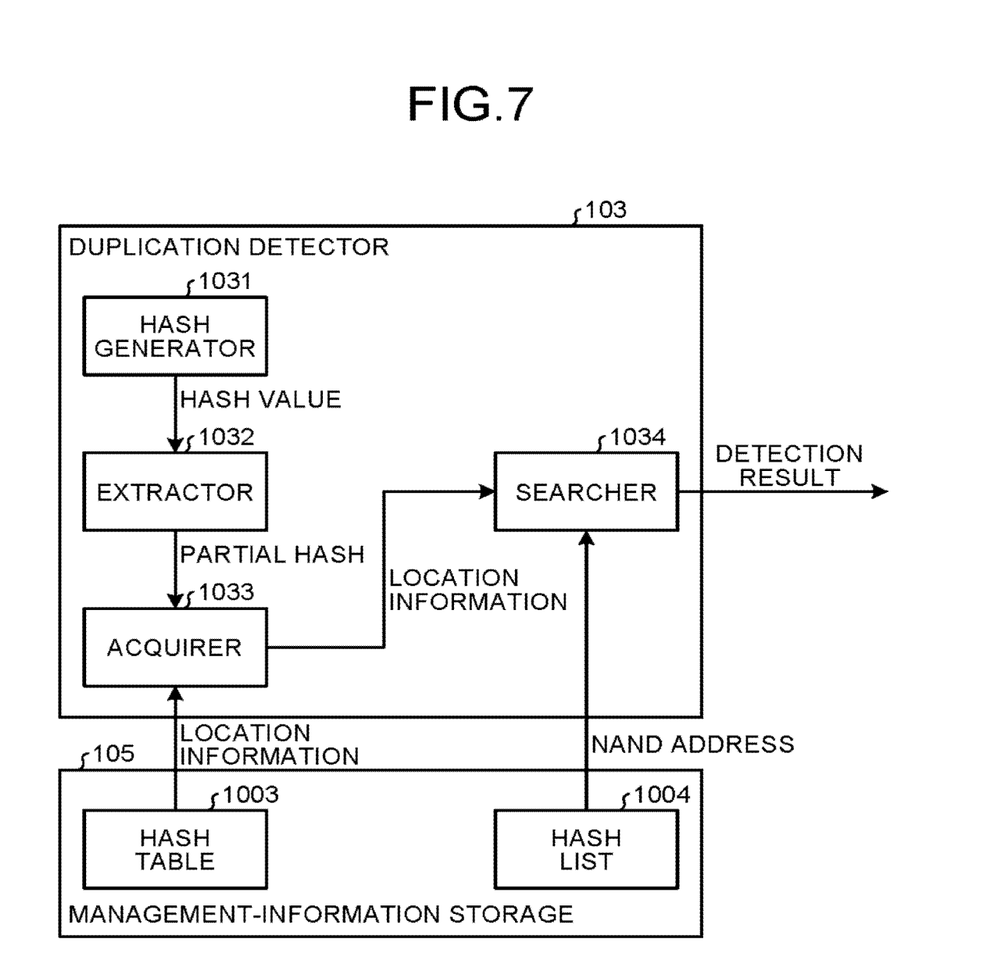
FIG. 7 is a diagram illustrating a function-block configuration of a duplication detector of the embodiment.

FIG. 7 is a diagram illustrating an example of a function-block configuration of the duplication detector of the SSD controller according to the embodiment. FIG. 8 is a diagram illustrating the duplication detecting process of the SSD controller according to the embodiment. With reference to FIGS. 7 and 8, the function block and the operation of the duplication detector 103 of the SSD controller 3 will be described.

As illustrated in FIG. 7, the duplication detector 103 includes a hash generator 1031, an extractor 1032, an acquirer 1033, and a searcher 1034.

The hash generator 1031 is a functional unit that generates a hash value from one-chunk data read by the reader 102. As an algorithm for determining a hash value from one-chunk data, as described above, for example, various algorithms, such as MD5, SHA-1, or SHA-2, can be applied. In the SSD, an error correcting code used as measures against a bit error occurring under the influence of the retention performance and the read disturbance of the flash memory can be used as a hash value. In this case, an error correcting code imparted to data read by the reader 102 is available as is for a hash value. Thus, the hash generator 1031 need not process a particular algorithm to determine a hash value and its throughput is reduced. In an example illustrated in FIG. 8, the hash generator 1031 generates a hash value "0330" (hexadecimal notation) from one-chunk data.

The extractor 1032 is a functional unit that extracts a part of data (e.g., one byte at the top) (which is referred to as "a partial hash", hereinafter) from a hash value generated by the hash generator 1031. In the example illustrated in FIG. 8, the extractor 1032 extracts data "03" of one byte at the top as a partial hash from the hash value "0330" generated by the hash generator 1031. The data length of the extracted partial hash is not limited to one byte, and is suitably set depending on a search speed and a memory capacity that can be secured in the management-information storage 105.

The acquirer 1033 is a functional unit that refers to the hash table 1003, which stored in the management-information storage 105 and acquires location information indicating the location in the hash list 1004 corresponding to a partial hash extracted by the extractor 1032. As illustrated in FIG. 8, the hash table 1003 is a table that associates a partial hash with location information indicating the location at which a hash value starting from the partial hash is stored in the hash list 1004. As illustrated in FIG. 8, the hash list 1004 is a list (a table in the example of FIG. 8) that associates hash values of a past predetermined number of pieces of one-chunk data on which the duplication detecting process has been performed with NAND addresses at which these pieces of data are stored. In the example illustrated in FIG. 8, because of each partial hash of one byte, the hash table 1003 associates each of the partial hashes of "00" to "off" with the corresponding location information. The hash table 1003 associates a partial hash with location information, but may associate a hash value itself with location information. In this case, the extractor 1032 need not perform the extraction operation of a partial hash. As illustrated in FIG. 8, the hash list 1004 shall store hash values in ascending order for a simple description. In this case, for example, each piece of location information indicates the top location of storage portions having a common partial hash among hash values in the hash list 1004, as illustrated in FIG. 8. For example, in the example of FIG. 8, when a partial hash extracted by the extractor 1032 is "03", the acquirer 1033 acquires the location information corresponding to the part hash "03" from the hash table 1003 and the location information indicates the location at which a hash value "0334" is stored in the hash list 1004. As described above, the hash list 1004 stores some past hash values on which the duplication detecting process has been performed, instead of hash values of respective data of the whole NAND-type flash memory 4. The hash values are not limited to being stored in the hash list 1004 in ascending order. For example, the hash values may be stored in descending order or may be stored so that hash values having the same partial hash among the hash values are consecutive, or a plurality of hash values having the same partial hash may be associated by what is called a list structure.

Figure 8:
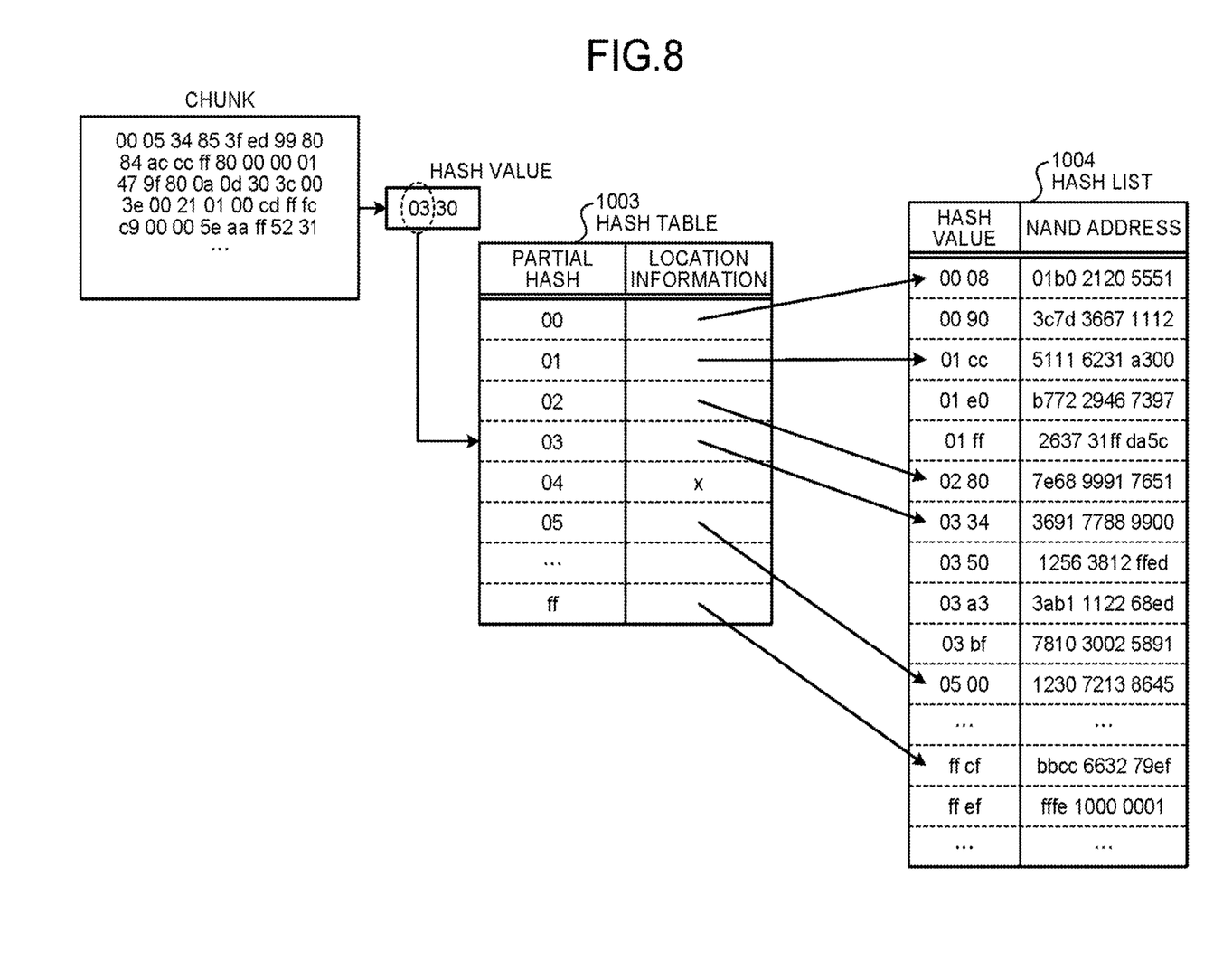
FIG. 8 is a diagram illustrating of a duplication detecting process of the SSD controller according to the embodiment.

The hash table 1003 illustrated in FIG. 8 is not limited to table format information, and may be any format information capable of associating a partial hash with location information. The hash list 1004 illustrated in FIG. 8 is substantially shown in table format information, but is not limited to such table format information and may be any format information capable of associating a hash value with a NAND address.

The searcher 1034 is a functional unit that refers to the hash list 1004, which is stored in the management-information storage 105, and conducts a linear search for a hash value that is a duplicate of (identical to) a hash value generated by the hash generator 1031 from the location of a hash value indicated by location information acquired by the acquirer 1033. When the searcher 1034 finds, in the hash list 1004, a hash value that is a duplicate of (identical to) a hash value generated by the hash generator 1031, this means that duplicate data of data read by the reader 102 from the storage area indicated by a scan address is also stored in a different storage area of the data storage 108. For example, when hash values having the same partial hash among hash values are stored consecutively in the hash list 1004, the searcher 1034 may conduct a linear search from the top location of the consecutive hash values indicated by location information. That is, the searcher 1034 may search for hash values in the vicinity of the location of a hash value indicated by location information acquired by the acquirer 1033.

When determining that a hash value generated by the hash generator 1031 is in duplicate, the searcher 1034 acquires the NAND address corresponding to the duplicate hash value from the hash list 1004. As a detection result of the duplication, the searcher 1034 then outputs whether there is data duplication, and the acquired NAND address in the case of duplication.

As above, the duplication detecting process by the duplication detector 103 first generates a hash value from one-chunk data targeted for the duplication detecting process, acquires location information roughly specifying where the hash value is stored in hash list 1004 from the hash table 1003, and conducts a linear search from the location that the location information indicates in the hash list 1004, so as to search for whether there is an identical hash value. This enables a rapid search for a hash value in comparison with a uniform linear search from the top of a hash list.

The hash generator 1031, the extractor 1032, the acquirer 1033, and the searcher 1034 of the duplication detector 103 illustrated in FIG. 7 are a conceptual presentation of their functions, and are not limited to such a configuration. For example, a plurality of functional units represented as separate functional units in the duplication detector 103 illustrated in FIG. 7 may be configured as a functional unit. In contrast, the function of a functional unit in the duplication detector 103 illustrated in FIG. 7 may be divided into a plurality of functions to be configured as a plurality of functional units.

Figure 9:
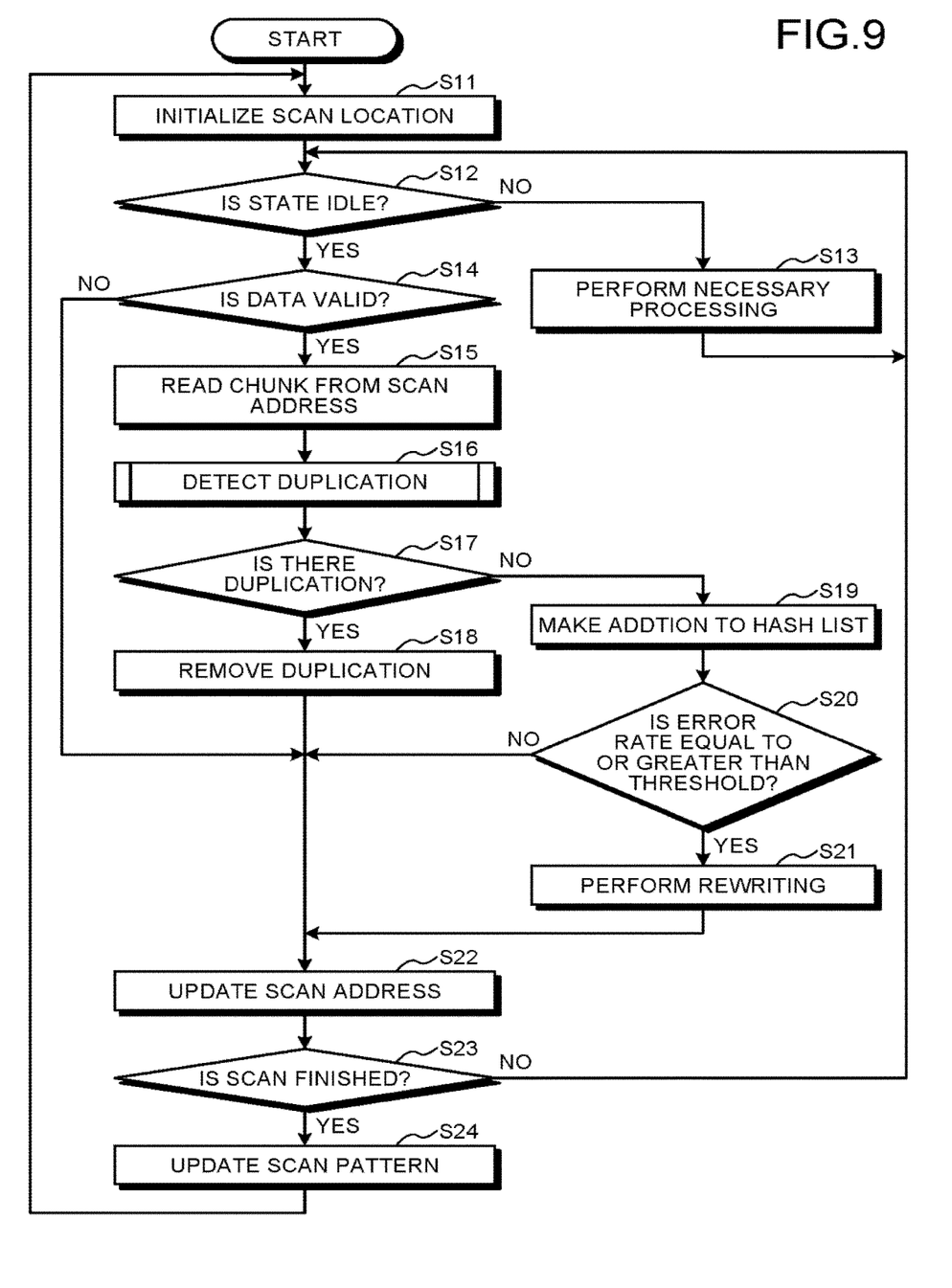
FIG. 9 is a flowchart illustrating a duplication removing process of the SSD controller according to the embodiment.
Figure 10:
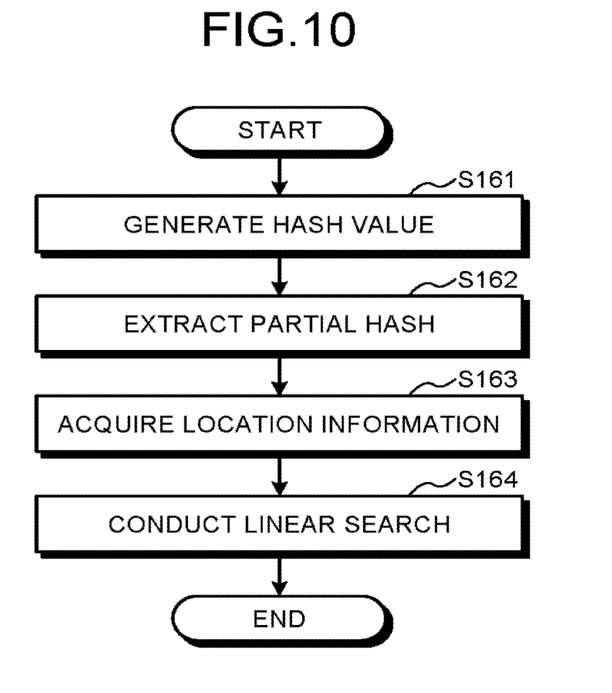
FIG. 10 is a flowchart illustrating a duplication detecting process of the SSD controller according to the embodiment.

FIG. 9 is a flowchart illustrating an example of the duplication removing process of the SSD controller according to the embodiment. FIG. 10 is a flowchart illustrating an example of the duplication detecting process of the SSD controller according to the embodiment. With reference to FIGS. 9 and 10, the flow of the duplication removing process of the SSD controller 3 according to the embodiment will be described.

Step S11

The address generator 101 initializes a scan location indicating a storage area that stores therein one-chunk data targeted for the duplication detecting process of the duplication detector 103. That is, the counter 1011 of the address generator 101 resets a counter value to "0", and assumes a scan address determined from the counter value "0" by the inverter 1012 and the scrambler 1013 as an initial address. Then, the process moves to Step S12.

Step S12

The reader 102 determines whether the storage device 1 is in an idle state. When read or write processing received from the host CPU 2 is performed by the storage device 1, the process causes the storage device 1 to be in a non-idle state to give a high priority to the processing. The idle state is a state where such processing having a high priority is not performed. The process moves to Step S14 when the storage device 1 is in the idle state (Yes at Step S12), and the process moves to Step S13 when the storage device 1 is in the non-idle state (No at Step S12).

Step S13

Since the write or read processing received from the host CPU 2 is performed and the processing has a high priority, the reader 102 waits until the processing is finished. Then, the process returns to Step S12.

Step S14

The reader 102 determines whether data in the storage area indicated by a scan address generated by the address generator 101 is valid data. Specifically, the reader 102 refers to the validity-management table 1002 of the management-information storage 105 and, when the valid flag corresponding to the scan address is "1", determines that the data in the storage area indicated by the scan address is valid data. The process moves to Step S15 when the data is valid data (Yes at Step S14), and the process moves to Step S22 when the data is not valid data (No at Step S14).

Step S15

The reader 102 determines that one-chunk data in the storage area indicated by the scan address is valid data and reads the one-chunk data. Then, the process moves to Step S16.

Step S16

The duplication detector 103 performs the duplication detecting process. This process detects whether one-chunk data that is a duplicate of the one-chunk data read by the reader 102 is stored in a different storage area, in the NAND-type flash memory 4. Steps S161 to S164 illustrated in FIG. 10 are performed as the duplication detecting process.

Step S161

The hash generator 1031 of the duplication detector 103 generates a hash value from the one-chunk data read by the reader 102. Then, the process moves to Step S162.

Step S162

The extractor 1032 of the duplication detector 103 extracts a partial hash that is a part of data from the hash value generated by the hash generator 1031. Then, the process moves to Step S163.

Step S163

The acquirer 1033 of the duplication detector 103 refers to the hash table 1003, which is stored in the management-information storage 105, and acquires location information indicating the location in the hash list 1004 corresponding to the partial hash extracted by the extractor 1032. Then, the process moves to Step S164.

Step S164

The searcher 1034 of the duplication detector 103 refers to the hash list 1004, which is stored in the management-information storage 105, and conducts a linear search for a hash value that is a duplicate of (identical to) the hash value generated by the hash generator 1031 from the location of a hash value indicated by the location information acquired by the acquirer 1033. When determining that a hash value generated by the hash generator 1031 is in duplicate, the searcher 1034 acquires the NAND address corresponding to the duplicate hash value from the hash list 1004. As detection result of the duplication, the searcher 1034 then outputs whether there is data duplication, and the acquired NAND address in the case of duplication.

The duplication detector 103 performs the duplication detecting process illustrated in Steps S161 to S164 above. Then, the process moves to Step S17.

Step S17

As a result of the duplication detecting process by the duplication detector 103, when data is in duplicate, that is, when one-chunk data that is a duplicate of the one-chunk data read by the reader 102 is stored in a different storage area (Yes at Step S17), the process moves to Step S18. In this case, the duplication detector 103 outputs the NAND address acquired by the searcher 1034 at which the duplicate data is stored to the duplication remover 104, as a detection result.

In contrast, as a result of the duplication detecting process by the duplication detector 103, when data is not in duplicate, that is, when the hash value of the data read by the reader 102 is not found at least in the hash list 1004 (No at Step S17), the process moves to Step S19. In this case, the duplication detector 103 outputs a notice that data is not in duplicate to the error detector 106 and the adder 109, as a detection result.

Step S18

When the duplication detector 103 detects one-chunk data that is a duplicate of the one-chunk data read by the reader 102, the duplication remover 104 removes (invalidates) the read data. Specifically, the duplication remover 104 rewrites the NAND address identical to the scan address (the corresponding logical address is assumed as "y", for example) with the NAND address output from the duplication detector 103 at which the duplicate data is stored (the corresponding logical address is assumed as "x", for example), in the address conversion table 1001, which is stored in the management-information storage 105. In this case, the NAND address corresponding to both the logical addresses "x" and "y" is the NAND address at which the duplicate data is stored, and the data in the storage area indicated by the scan address will be unnecessary in future. Then, the duplication remover 104 refers to the validity-management table 1002, which is stored in the management-information storage 105, and overwrites the valid flag corresponding to the NAND address identical to the scan address with "0" to invalidate it. The process then moves to Step S22.

Step S19

When the duplication detector 103 fails to detect one-chunk data that is a duplicate of the one-chunk data read by the reader 102, the adder 109 updates the contents of the hash table 1003 and adds information to the hash list 1004, assuming that the read data is new data.

Specifically, since the one-chunk data read from the scan address by the reader 102 is not in duplicate, the adder 109 needs to add its hash value to the hash list 1004. Thus, the adder 109 first searches the hash list 1004 for the hash value generated by the hash generator 1031 (which may be referred to as "a generated hash value", hereinafter) from the location information acquired by the acquirer 1033, to insert and add the generated hash value between a hash value smaller than the generated hash value and a hash value larger than the generated hash value. Furthermore, the adder 109 adds a scan address to the hash list 1004, as the NAND address corresponding to the generated hash value that has been added. This adds a row indicating the hash value of the one-chunk data read from the scan address by the reader 102 and the scan address.

When the number of entries of the hash list 1004 reaches its upper limit before the adder 109 adds the generated hash value, the row of the oldest hash value in the hash list 1004 is deleted, instead of addition of the generated hash value by the adder 109. That is, the hash list 1004 uses a first-in-first-out (FIFO) to prevent the number of entries of data from exceeding its upper limit. To implement such a FIFO, for example, in addition to the association between a hash value and a NAND address, the hash list 1004 may store the hash value in association with, for example, information indicating the time when the hash value is added or the added order. This enables the adder 109 to find the row of the oldest hash value from the hash list 1004. Alternatively, information indicating which row of the hash list 1004 stores therein the oldest hash value may be managed as other information. The deletion of the row of an old hash value does not necessarily target the oldest hash value in the whole hash list 1004. For example, this may be a manner of deleting the row of the oldest hash value in hash values having the same partial hash.

Furthermore, adding the row of the generated hash value to the hash list 1004 causes the location information corresponding to a partial hash to be shifted in the hash table 1003, and thus the adder 109 updates the location information in the hash table 1003.

Then, the process moves to Step S20.

Step S20

When the duplication detector 103 fails to detect one-chunk data that is a duplicate of the one-chunk data read by the reader 102, the error detector 106 calculates an error rate r of the read one-chunk data in Equation (1) above and performs a threshold determination of the calculated error rate r to detect an error. The error detector 106 calculates the error rate r with Equation (1) above from the correctable number of error bits determined based on an error correcting code imparted to the read one-chunk data. The error detector 106 then determines whether the error rate r is equal to or greater than a predetermined threshold. When the error rate r is equal to or greater than the threshold (Yes at Step S20), the process moves to Step S21 assuming that an error is detected in the read data, and when the error rate r is less than the threshold (No at Step S20), the process moves to Step S22.

Step S21

The rewriter 107 rewrites data in which an error is detected by the error detector 106 (data on which it is determined that the error rate r is equal to or greater than a threshold) into a different storage area of the data storage 108. In this case, for data with a detected error, the rewriter 107 corrects the error based on the imparted error correcting code and adds a new error correcting code to the corrected data, to rewrite it into a different storage area of the data storage 108. Such rewriting causes the written data to be refreshed, and thus allows the occurrence of a bit error to be inhibited.

With the rewriting of data, the rewriter 107 updates the contents of the address conversion table 1001, the validity-management table 1002, and the hash list 1004, which are stored in the management-information storage 105. Specifically, in the address conversion table 1001, the rewriter 107 first rewrites the NAND address identical to the scan address with the NAND address indicating the different storage area in which the rewriting is performed. Furthermore, in the validity-management table 1002, the rewriter 107 rewrites the valid flag corresponding to the scan address to "0" (invalidity) and rewrites the valid flag corresponding to the NAND address indicating the different storage area in which the rewriting is performed to "1" (validity). In the hash list 1004, the rewriter 107 then rewrites the NAND address (scan address) corresponding to the generated hash value added by the adder 109 with the NAND address indicating the different storage area in which the rewriting is performed. The process then moves to Step S22.

Step S22

The address generator 101 updates the scan address according to the current scan pattern, to indicate a storage area of one-chunk data that is a new target of the duplication detecting process in the duplication detector 103. Specifically, the counter 1011 of the address generator 101 increments its counter value and updates a scan address determined from the incremented counter value by the inverter 1012 and the scrambler 1013 as a new scan address. Then, the process moves to Step S23.

Step S23

The address generator 101 determines whether the scan has been carried out for every storage area of the data storage 108 (the NAND-type flash memory 4), that is, whether the duplication detecting process has been performed by the duplication detector 103. Specifically, the address generator 101 performs the determination based on whether the counter value of the counter 1011 has reached the number of NAND addresses that indicates all the chunks of the data storage 108, that is, the final address of the NAND addresses. The process moves to Step S24 when the scan is finished for every storage area of the data storage 108 (Yes at Step S23), and the process returns to Step S12 when the scan is not finished (No at Step S23).

Step S24

When the scan has been carried out for every storage area of the data storage 108 (the duplication detecting process has been performed by the duplication detector 103), the pattern updater 110 reads particular scan-pattern information from the management-information storage 105 according to a predetermined manner or frog the management-information storage 105 at random. The pattern updater 110 then outputs a scan-pattern-update command to update the inversion mode of the inverter 1012 and the scramble pattern of the scrambler 1013, based on the read scan-pattern information, so as to perform an update to a new scan pattern. Then, the process returns to Step S11.

The operation of Steps S11 to S24 above carries out the duplication removing process by the SSD controller 3.

As above, since the address generator 101 generates scan addresses according to a scan pattern, the SSD controller 3 according to the embodiment generates discontinuous addresses as such scan addresses in sequence and targets data at the scan addresses for the duplication detecting process. This enables the duplication detection for respective data at separate NAND addresses, and enables the duplication detection for the whole NAND-type flash memory 4 with a hash list that stores some past hash values without an enormous hash list having hash values of all the data in the NAND-type flash memory 4, so as to allow data duplication to be effectively detected.

When the scan has been carried out for every storage area of the data storage 108 based on the scan addresses from the address generator 101 according to the particular scan pattern (the duplication detecting process has been performed by the duplication detector 103), the pattern updater 110 reads particular scan-pattern information from the management-information storage 105 according to a predetermined manner or from the management-information storage 105 at random, and updates the scan pattern for the address generator 101 to generate scan addresses. This enables duplication for data at each storage area of the NAND-type flash memory 4 to be detected more comprehensively, and enables data duplication to be detected more effectively.

The duplication detecting process by the duplication detector 103 first generates a hash value from one-chunk data targeted for the duplication detecting process, acquires location information roughly specifying where the hash value is stored in the hash list 1004 from the hash table 1003, and conducts a linear search from the location that the location information indicates in the hash list 1004, so as to search for whether there is an identical hash value. This enables a rapid search for a hash value in comparison with a uniform linear search from the top of a hash list, and thus allows data duplication to be effectively detected.

When the duplication detector 103 detects data duplication, the duplication remover 104 removes any piece of the duplicate data. This enables data stored in the NAND-type flash memory 4 to be compressed, and allows the NAND-type flash memory 4 to be effectively utilized.

The error detector 106 detects whether there is any error for one-chunk data read by the reader 102 and the rewriter 107 rewrites data in which the error detector 106 detects an error into a different storage area of the data storage 108. This causes the written data to be refreshed, and thus allows the occurrence of a bit error to be inhibited.

Although the duplication removing process of the SSD controller 3 according to the above-described embodiment performs the removal of duplicate data with the duplication remover 104, instead of this operation, the duplication remover 104 (notifier) may notify the host CPU 2 of information indicating data duplication, such as the logical address corresponding to the NAND address indicating a storage area of duplicate data. In this case, the actual operation of the duplication removal of data will be left to commands from the host CPU 2.

The above-described embodiment assumes that the operation of the inverter 1012 and the scrambler 1013 is changed based on the scan-pattern-update command output from the pattern updater 110 for an update of a scan pattern, but is not limited to this. That is, instead of the scan-pattern information that defines the operation of the inverter 1012 and the scrambler 1013, the management-information storage 105 may store therein scan-pattern information that directly defines in which order data at each NAND address of the NAND-type flash memory 4 is scanned. In this case, the address generator 101 may directly generate scan addresses according to a scan pattern that defines a scan order.

The above-described embodiment assumes that for data in the storage area indicated by a scan address, the error detector 106 performs an error detection of the data when the duplication detector 103 assumes that the data is not in duplicate, but is not limited to this. For example, regardless of whether there is data duplication determined by the duplication detector 103, for all the data in the storage areas indicated by an addresses, data after the error detection by the error detector 106 and the error correction by the rewriter 107 may be rewritten.

A computer program executed in the CPU of the SSD controller 3 of the above-described embodiment may be provided by being stored, for example, in a computer-readable storage medium, which may be provided as a computer program product, such as a compact disc read only memory (CD-ROM), a compact disc-recordable (CD-R), a memory card, a digital versatile disc (DVD), or a flexible disk (FD), as a file in installable or executable format.

The computer program executed in the CPU 6 of the SSD controller 3 of the above-described embodiment may be also provided by being stored on a computer coupled to networks, such as the Internet, and be downloaded via such networks. The computer program executed in the CPU 6 of the SSD controller 3 of the above-described embodiment may be also provided or distributed via networks, such as the Internet. The computer program executed in the CPU 6 of the SSD controller 3 of the above-described embodiment may be also provided by being incorporated in a read only memory (ROM) in advance.

The computer program executed on the CPU 6 of the SSD controller 3 of the above-described embodiment has a module configuration that causes the above-described functions performed in the CPU 6 to be implemented on a computer. For real hardware, the CPU 6 reads the computer program from a storage device the DRAM 5 or the NAND-type flash memory 4) to execute it, so that the above-described functions are implemented on the storage device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage controller comprising:
    a circuitry configured to implement:
    an address generator configured to generate a scan address, which is one of discontinuous addresses indicating storage areas of a first storage that store therein externally written data, according to a particular scan pattern for defining an order of an address of data to be read;
    a reader configured to read data from a storage area of the storage areas of the first storage indicated by a scan address of the scan addresses;
    a duplication detector configured to detect whether the data read by the reader is a duplicate of any one of pieces of data in the first storage by detecting whether a hash value of the data read by the reader is a duplicate of any one of hash values of a past predetermined number of pieces of data, wherein
    the reader reads the data in a unit of a predetermined size from the storage area of the first storage indicated by the scan address;
    the duplication detector includes:
        a hash generator configured to generate the hash value from the data having the predetermined size read by the reader,
        an acquirer configured to acquire location information corresponding to information indicating part of the hash value generated by the hash generator from second information in which information indicating part of the hash value and location information indicating a location in first information including the hash values of the predetermined number of pieces of data are associated with each other, the first information being stored in a second storage, and
        a searcher configured to conduct a linear search from the location in the first information indicated by the location information acquired by the acquirer for a hash value identical to the hash value generated by the hash generator, to detect whether there is a duplicate of the data having the predetermined size read by the reader;
    after the duplication detection by the duplication detector, the address generator updates the scan address according to the particular scan pattern to indicate another storage area of the first storage that is a new target of the duplication detection, the updated scan address being one of the discontinuous addresses,
    the storage controller further comprises a pattern updater configured to perform an update to a different scan pattern from the particular scan pattern after the duplication detector performs duplication detection for data in every storage area of the first storage, the duplication detection been performed using the particular scan pattern, and
    the storage controller further comprises an adder configured to add, when the duplication detector detects that the data read by the reader is not in duplicate, the hash value to the first information.

2. The storage controller according to claim 1, wherein the first storage is a NAND-type flash memory.

3. The storage controller according to claim 1, wherein the duplication detector detects whether the hash value of the data read by the reader is a duplicate of any one of the hash value of the predetermined number of pieces of data having a number smaller than the number of all pieces of data stored in the first storage.

4. The storage controller according to claim 1, wherein the first storage stores therein the externally written data and an error correcting code of the data, and
    the duplication detector uses the error correcting code of the data having the predetermined size as the hash value.

5. The storage controller according to claim 1, further comprising a duplication remover configured to, when the duplication detector detects that the data read by the reader is in duplicate, invalidate any one of the data read by the reader and duplicate data of the data so as to remove duplication.

6. The storage controller according to claim 1, further comprising a notifier configured to, when the duplication detector detects that the data read by the reader is in duplicate, notify a controller that accesses the first storage of information indicating which data is in duplicate.

7. The storage controller according to claim 1, further comprising:
    an error detector configured to calculate an error rate of the data read by the reader, and detect that the data has an error when the error rate is equal to or greater than a predetermined value; and
    a rewriter configured to rewrite the data in which the error detector detects an error into a different storage area from a storage area in which the data is stored in the first storage.

8. A storage device comprising:
    the first storage; and
    the storage controller according to claim 1.

9. A storage controller comprising:
    a circuitry configured to implement:
    an address generator configured to generate a scan address, which is one of discontinuous addresses indicating storage areas of a storage that store therein externally written data, according to a particular scan pattern for defining an order of address of data to be read;

a reader configured to read data from the storage area of the storage indicated by the scan address;

a duplication detector configured to detect whether the data read by the reader is a duplicate of any one of a past predetermined number of pieces of data; wherein after the duplication detection by the duplication detector, the address generator updates the scan address according to the particular scan pattern to indicate another storage area of the storage that is a new target of the duplication detection, the updated scan address being one of the discontinuous addresses; and a pattern updater configured to perform an update to a different scan pattern from the particular scan pattern after the duplication detector performs duplication detection for data in every storage area of the storage, the duplication detection been performed using the particular scan pattern, wherein the address generator generates a scan address according to the different scan pattern, the reader reads the data in a unit of a predetermined size from the storage area of the storage indicated by the scan address; and the duplication detector includes:

a hash generator configured to generate a hash value from the data having the predetermined size read by the reader, an acquirer configured to acquire location information corresponding to information indicating part of the hash value generated by the hash generator from second information in which information indicating part of the hash value and location information indicating a location in first information including the predetermined number of pieces of data are associated with each other, and a searcher configured to conduct a linear search from the location in the first information indicated by the location information acquired by the acquirer for a hash value identical to the hash value generated by the hash generator, to detect whether there is a duplicate of the data having the predetermined size read by the reader.

10. The storage controller according to claim 9, wherein the duplication detector detects whether the data read by the reader is a duplicate of any one of the predetermined number of pieces of data having a number smaller than the number of all pieces of data stored in the storage.

11. The storage controller according to claim 9, wherein
the storage stores therein the externally written data and an error correcting code of the data, and
the duplication detector uses the error correcting code of the data having the predetermined size as the hash value.

12. The storage controller according to claim 9, further comprising a duplication remover configured to, when the duplication detector detects that the data read by the reader is in duplicate, invalidate any one of the data read by the reader and duplicate data of the data to remove duplication.

13. The storage controller according to claim 9, further comprising a notifier configured to, when the duplication detector detects that the data read by the reader is in duplicate, notify a controller that accesses the storage of information indicating which data is in duplicate.

* * * * *